United States Patent [19]

Tung

[11] Patent Number: 4,795,200
[45] Date of Patent: Jan. 3, 1989

[54] LENGTHENED TUBULAR PIN MEMBER NOSE FOR IMPROVING SEALING INTEGRITY AND BEARING FORCES

[75] Inventor: Lawrence Y. Tung, Houston, Tex.
[73] Assignee: Hydril Company, Houston, Tex.
[21] Appl. No.: 168,544
[22] Filed: Mar. 9, 1988

Related U.S. Application Data

[63] Continuation of Ser. No. 937,750, Dec. 4, 1986, abandoned.

[51] Int. Cl.⁴ .............................................. F16L 25/00
[52] U.S. Cl. .................................... 285/334; 285/917
[58] Field of Search ....................... 265/337, 334, 355; 285/917

[56] References Cited

U.S. PATENT DOCUMENTS

| | | | |
|---|---|---|---|
| 2,107,716 | 2/1938 | Singleton | 285/333 X |
| 2,211,179 | 8/1940 | Stone | 285/334 |
| 2,992,019 | 7/1961 | MacArthur | 285/334 X |
| 3,307,860 | 3/1967 | Blount et al. | 285/334 X |
| 4,624,488 | 11/1986 | Furgerson | 285/334 |
| 4,662,659 | 5/1987 | Blose et al. | 285/334 |

OTHER PUBLICATIONS

Formulas for Stess and Strain, Chapter 12, Roark and Young.
Abstract from ANSYS FEM Handbook.
Stress Analysis and FEA, Excerpts from Hydril Engineering Reports, 1 p.

*Primary Examiner*—Dave W. Arola
*Attorney, Agent, or Firm*—Vaden, Eickenroht, Thompson & Boulware

[57] ABSTRACT

A tubular connection having a nose extension on the pin member for stiffening the member and exhancing the conical seal area forward of the first thread, which seal is spaced at a distance from the time end by a non-sealing nose extension that is at least as long as the sealing area. The integrity of the seal is improved, the bearing surface is enlarged and the tendency of galling is reduced.

2 Claims, 1 Drawing Sheet

LENGTHENED TUBULAR PIN MEMBER NOSE FOR IMPROVING SEALING INTEGRITY AND BEARING FORCES

This application is a continuation, of application Ser. No. 937,750, filed 12/04/86 now abandoned.

BACKGROUND OF THE INVENTION

1. Field of the Invention

This invention pertains to tubular connections and more particularly to tubular connections having a metal-to-metal seal forward of the threads on the pin member of the connection.

2. Description of the Prior Art

Tubular connections comprise a pin or male member and a box or female member. In some cases, two lengths of pipe or other tubular goods are joined pin end to pin end employing a coupling having two box ends. In most cases, however, the pin end of one tubular member is secured directly into the box end of an adjoining tubular member. As referred to herein, a "tubular connection" is understood as meaning a connection involving a pin member and a box member, regardless as to whether that box member is included in a coupling or in a tubular length of product.

Although different connections include a sealing arrangement at different places, a popular location for a metal-to-metal seal location in a tubular connection is in a conical area located forward of the first thread in the pin member of the connection. This area is not within the threads and is usually made between matching surfaces of the pin member and the box member on a surface that has a slight longitudinal taper with respect to the axis of the connection. Usually this taper is on the order of about 7°, although very shallow tapers of about 2° and steeper tapers of about 14° are also fairly common.

In the prior art connections, the seal area on the pin member tapers from a point in front of the first thread to the tip end of the pin member. The two mating surfaces come in contact as the connection is torqued so that when it is completely power torqued there is an area range within this overall area that is tightly pressed sealed together. To further describe the areas on the pin member and the box member, there is a short section in front of the most forward thread on the pin member where no sealing contact occurs. The conical metal-to-metal surface then progresses toward the tip or nose or distal end of the pin member. There is a small chamfer between the conical surface and the tip end. Therefore, the entire metal-to-metal sealing area is located between the chamfer and the non-sealing area in front of the first thread. It is assumed for purposes herein that the box member conical surface corresponding to the pin member conical surface is at an identical longitudinal taper. In many cases the box taper is slightly steeper than the taper of the pin member surface; however, this invention relates to such connections as well. For convenience of discussion, the taper of the pin member and the box member will be considered to be at the same angle.

Returning to the pressed seal condition of the connection, an analysis shows that the area where the surfaces are pressed sealed together the hardest occurs in the conical seal area nearest the first thread on the pin member. That is, for identical conical sealing surfaces on the pin member and box member, although the area in sealing contact might appear casually to be the entire surface, only the approximate one-tenth to one-third of the area nearest the first thread will be leak sealed with respect to internal gas pressures above about 20,000 psi. Further with respect to the prior art connection just described, the metal of both the pin member and box member is stressed upon full torquing in a relative narrow concentration band. This is because the tip end tends to flex slightly away from being tightly pressed sealed.

Therefore, it is a feature of the present invention to provide an improved tubular connection with a stiffer pin member in the vicinity of the seal on the forward end of the pin member to increase the integrity of the seal by increasing its bearing surface, thereby also reducing the tendency of the connection to galling.

It is another feature of the present invention to provide an improved tubular connection with a pin member having an extended nose in front of the seal area of the pin member to stiffen the pin member and thereby enhance the connection.

SUMMARY OF THE INVENTION

A tubular connection having a pin member and a box member includes a conical seal area on the pin member forward of the first thread on the pin member for making a metal-to-metal seal with a matching conical area on a mating box member as the connection is powered torqued. The nose of the pin member extends a distance beyond the seal area. Preferably, this nose extension is not appreciably tapered and extends an axial distance equal to or greater than the axial distance of the seal area. This extension is conveniently referred to as the bumper nose extension.

The presence of the bumper nose extension locates the seal area away from the tip end of the pin member, stiffens the pin in the seal area, thereby causing the tightly pressed seal area to be less concentrated. This increase in the bearing surface reduces the tendency of galling and improves the integrity of the connection.

BRIEF DESCRIPTION OF THE DRAWINGS

So that the manner in which the above-recited features, advantages and objects of the invention as well as others which will become apparent, are attained and can be understood in detail, more particular description of the invention briefly summarized above may be had by reference to the embodiments thereof that are illustrated in the appended drawings, which drawings form a part of this specification. It is to be noted, however, that the appended drawings illustrate only preferred embodiments of the invention and are therefore not to be considered limiting of its scope as the invention may admit to other equally effective embodiments.

In the Drawings

DESCRIPTION OF THE PREFERRED EMBODIMENTS

Figure 1:
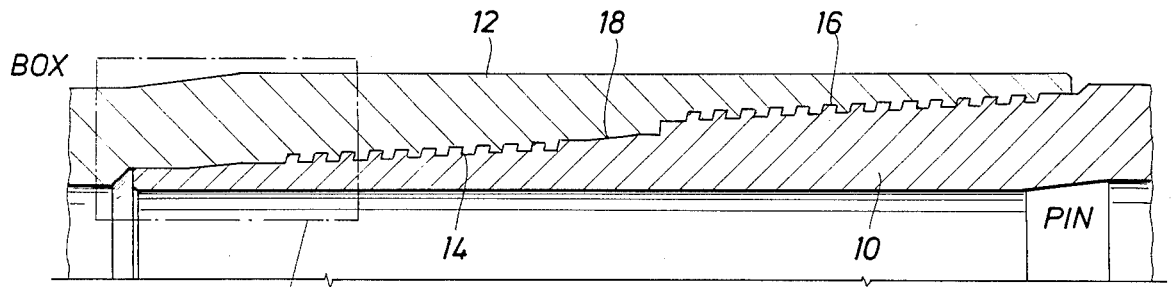
FIG. 1 is a longitudinal cross-section of a tubular connection in accordance with a preferred embodiment of the present invention.

Now referring to the drawings and first to FIG. 1, a preferred embodiment of a premium tubular connection is illustrated comprising a pin member 10 and a box member 12. The connection illustrates a two-step thread arrangement comprising a thread set 14 and a separate thread set 16 with an intermediate step area 18 therebetween. Although a two-step thread arrangement is illustrated in FIG. 1, the invention is not limited thereto. Any interengaged thread connection is enhanced by the feature hereinafter described.

Figure 2:
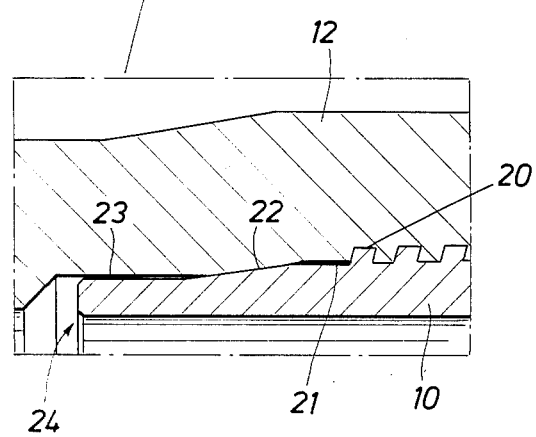
FIG. 2 is an enlargement of the forward end of the pin member employed in the connection shown in FIG. 1.

The forward end of pin member 10 is shown in an enlarged view in FIG. 2 and comprises the most forward thread 20 on the pin member followed (in a direction toward the nose) by a non-sealing area 21. Area 21 is then followed by an area entitled "primary internal seal (metal-to-metal)", hereinafter referred to as seal area 22. Finally, there is another non-sealing area 23 in front of area 22, which is on the bumper nose extension. Typically seal area 22 is on a conical surface on the pin member and mates with an accommodating conical surface on the box member. As mentioned, forward of seal area 22 is a nose extension 24, which extension includes area 23. As illustrated, area 23 is opposite a portion of the box member that is in non-sealing contact. This is shown by a space therebetween, although in actual practice the space may be quite small or actually non-existent. Seal area 22 is in pressed sealing contact as described hereinafter but area 23 of extension 24 is not. It may be also apparent that the surface of the extension may be conical or cylindrical, since it does not enter into the sealing engagement between the box member and the pin member.

It has been discovered that the stiffness of the pin member is enhanced by the presence of extension 24 over a pin member which terminates at a point directly in front of seal area 22. That is, with an appreciable nose extension 24, the seal occurs in an area which is some distance from the tip or nose end rather than near it, thereby enhancing the integrity of the seal bearing. This is because the sealing area is less concentrated. In addition, the tendency of galling in the seal area is reduced.

Figure 3:
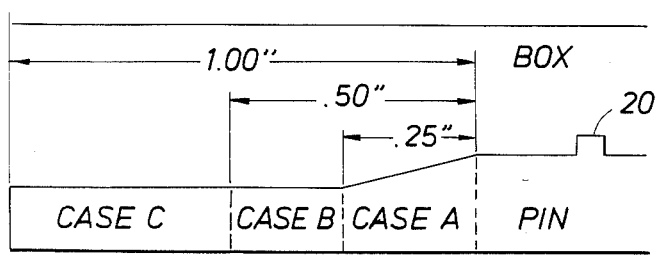
FIG. 3 is a schematic diagram of the forward end of alternate pin member structures employed in tubular connections.

A study has been made on having an extended end on three sizes of tubular connections, namely on tubular stock with an outside diameter of 4.5 inches, 7 inches, and 13.625 inches. In each case, improvement in the operating characteristics as hereinafter described were observed. The studies pertained to connections including a pin member with different nose lengths or extensions as illustrated in FIG. 3. In one series of study, the pin member terminated as shown by the area labeled "Case A" only. In a second study the pin member terminated in an extension including the area labeled "Case B" as well as the preceding area. Finally, a study was performed involving an extension including the area referred to as "Case C" in addition to the previous areas. For convenience, the overall length of the seal area and, when applicable, the extension area in front thereof on the pin member is shown in relative inch dimensions. For example, Case A illustrates a pin member having a seal area in accordance with the prior art, which would be 0.25 inches on a scale of 1 inch for Case C. The intermediate situation is Case B, shown as being one-half inch in length with respect to the Case C dimension.

As shown in the table set forth below, seal contact forces were improved 32% to 49% by adding a "0.25 inch" bumper nose extension (i.e., Case B with respect to Case A). The seal contact forces were improved up to 78% to 156% by adding a 0.75 inch bumper nose extension (Case C compared with Case A).

| SEAL BEARING FORCE CALCULATIONS | | | | | |
|---|---|---|---|---|---|
| | Total Seal Contact Force (lbs.) | | | | |
| Product | Case A | Case B | B/A | Case C | C/A |
| 4.5"-12.6 lbs/ft | 18,700 | 27,900 | 149% | 33,300 | 178% |
| 7"-32.0 lbs/ft | 32,900 | 45,800 | 139% | 70,400 | 210% |
| 13.625"-88.0 lbs/ft | 34,000 | 44,700 | 132% | 87,000 | 256% |

The above results were based on a formula derived from the materials described in *Formulas for Stress and Strain*, Roark and Young, 5th editon.

The stresses in the connection were also analyzed by computer modeling to observe the stresses imparted to a connection joint using ANSYS FEM stress analysis. Both a short nose model (equivalent to Case A above) and a long nose model (equivalent to Case C above) were loaded with minimum and maximum seal interference assembly load. The FEM results illustrate that the total contact force on the primary seal for the long nose model to be about 70% more than it is for the short nose model.

The following table are the results of determining the sealing force of short and long nose models with respect to 7 inch tubular stock, 29 lbs/ft.

| | Total Seal Contact Force (lbs.) | |
|---|---|---|
| | Minimum Interference | Maximum Interference |
| Short Nose | 8,503 | 19,905 |
| Long Nose | 14,435 | 33,427 |
| Long/Short | 170% | 168% |

Figure 4:
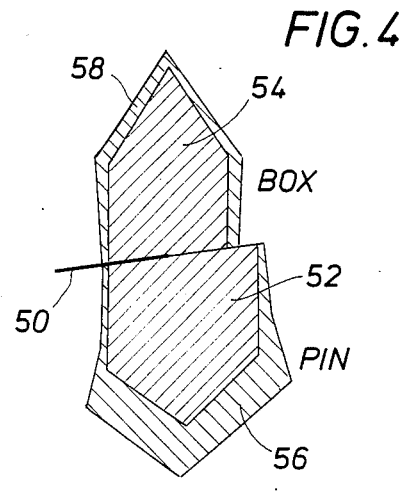
FIG. 4 is a bearing contact stress distribution finite element analysis diagram of a tubular connection employing a short nose on the pin member in accordance with the prior art.
Figure 5:
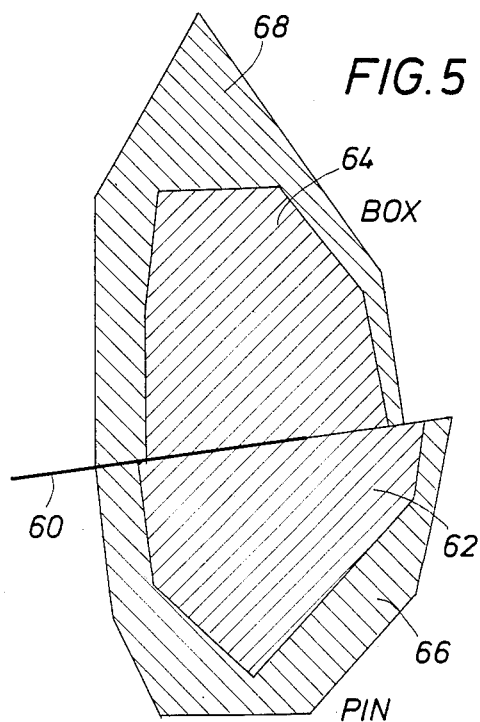
FIG. 5 is a bearing contact stress distribution finite element analysis diagram of a tubular connection employing a long nose on the pin member in accordance with a preferred embodiment of the present invention.

In addition, it has also been observed that the primary seal contact width of the long nose model is more than 150% wider than for the short nose model. This may be shown more graphically by comparing the stress results as illustrated in FIGS. 4 and 5, respectively. FIG. 4 is the stress distribution diagram for the short nose model (maximum interference) and FIG. 5 is the stress distribution diagram for the long nose model (maximum interference).

Now referring to FIG. 4, the stresses in the pin member are shown below the seal contact line and the stresses in the box member are shown above the contact line for the short nose model, maximum interference. The entire primary seal occurs along area 50; however, it will be seen from the shaded areas that stresses occur in the pin member and the box member both where the seal occurs and where no sealing is occurring. Everything within area 52 of the pin member and area 54 of the box member are stressed to 28,000 psi or greater. Area 56 for the pin member and area 58 for the box member are stressed to less than 28,000 psi and more than 21,000 psi. The area outside of areas 56 and 58 are stressed less than 21,000 psi. It can be further demonstrated, although not shown in the diagram, that there are appreciably stressed areas beyond 84,000 psi in the middle of areas 52 and 54, respectively.

Now referring to FIG. 5, the stresses in the pin member are shown below the seal contact line and the stresses in the box member are shown above the contact line for the long nose model, maximum interference. The entire primary seal occurs along area 60, which is much larger than area 50 of FIG. 4. Again, it will be seen from the shaded areas that stresses occur in the pin member and the box member both where the seal occurs and where no sealing is occurring. Again, everything within area 62 of the pin member and area 64 of the box member are stressed to 28,000 psi or greater. Area 66 for the pin member and area 68 for the box member are stressed to less than 28,000 psi and more than 21,000 psi. The area outside of areas 66 and 68 are stressed less than 21,000 psi. It can be demonstrated, in addition, although not shown in FIG. 5, that there are very small stressed areas in the middle of areas 62 and 64, respectively, that are stressed beyond 84,000 psi.

It will be apparent from comparing FIG. 4 with FIG. 5 that not only is seal area 60 much larger than seal area 50, but the comparably stressed areas of FIG. 5 are much larger than the respectively stressed ares of FIG. 4. The peak stress of FIG. 4 is approximately 18% higher than the peak stress of FIG. 5.

What is also not shown in FIG. 5 is that there is a secondary sealing surface that appears on the long nose model which does not correspondingly appear on the short nose model. Hence, it is demonstrated that the primary seal on the long nose model functions much like a beam with both ends fixed. This structure doubles the stability of the seal compared with the short nose model, which performs more like a cantilever beam.

Similar stress diagrams with minimum interference produce comparable results for short nose and long nose models.

While particular embodiments of the invention have been shown and described, with numerous variations suggested, it will be understood that the invention is not limited thereto, since many modifications may be made and will become apparent to those skilled in the art.

What is claimed is:

1. A threaded connection comprising a box having internal threads and a pin having internal threads for mating with the threads on the box when the connection is made up, a conical surface on the pin between the threads and the end of the pin and a conical surface on the box for engaging the conical surface on the pin and forming a metal-to-metal seal when the connection is made up, said pin further having an end portion spaced from the box and extending beyond the conical surface a distance at least equal to the projected length of the conical sealing surface along the longitudinal axis of the connection to stiffen the pin and increase the area of the conical sealing surfaces that are in sealing engagement.

2. The connection of claim 1 in which the end portion of the pin extends beyond the conical sealing surface a distance between one and three times the projected length of the sealing surface along the longitudinal axis of the connection.

* * * * *

UNITED STATES PATENT AND TRADEMARK OFFICE
CERTIFICATE OF CORRECTION

PATENT NO.  : 4,795,200
DATED       : January 3, 1989
INVENTOR(S) : Lawrence Y. Tung It is certified that error appears in the above-indentified patent and that said Letters Patent is hereby corrected as shown below:

Col. 6, line 14, change "internal" (second occurrence) to --external--.

Signed and Sealed this

Fourteenth Day of October, 1997

Attest:

BRUCE LEHMAN

*Attesting Officer*     *Commissioner of Patents and Trademarks*